J. R. Hoffman,
Saw Mill.
No. 97,640.  Patented Dec. 7, 1869.
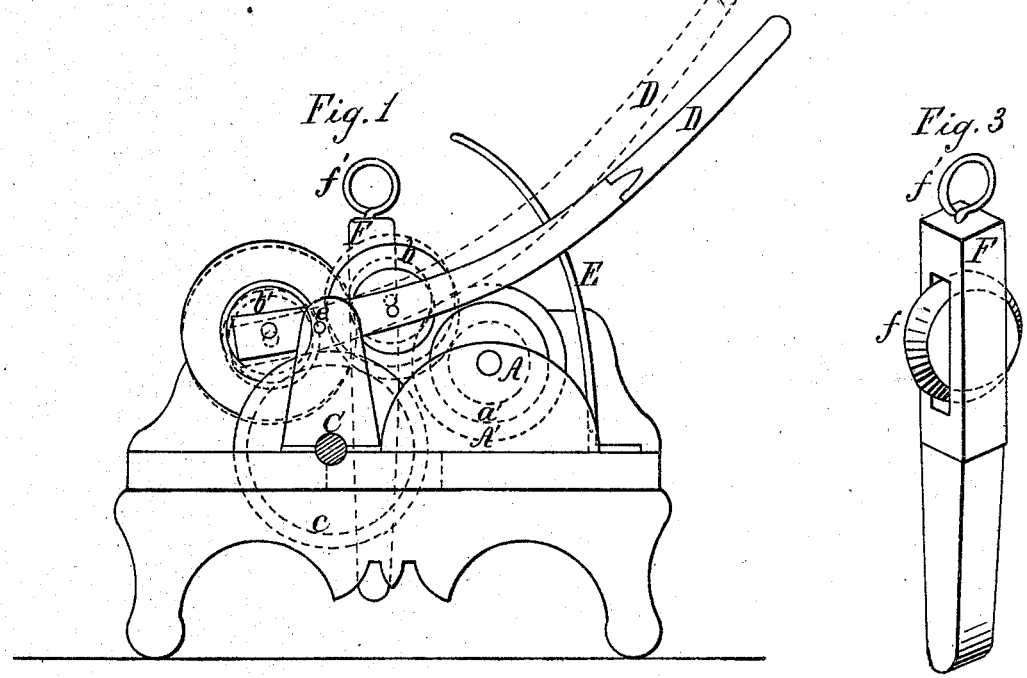
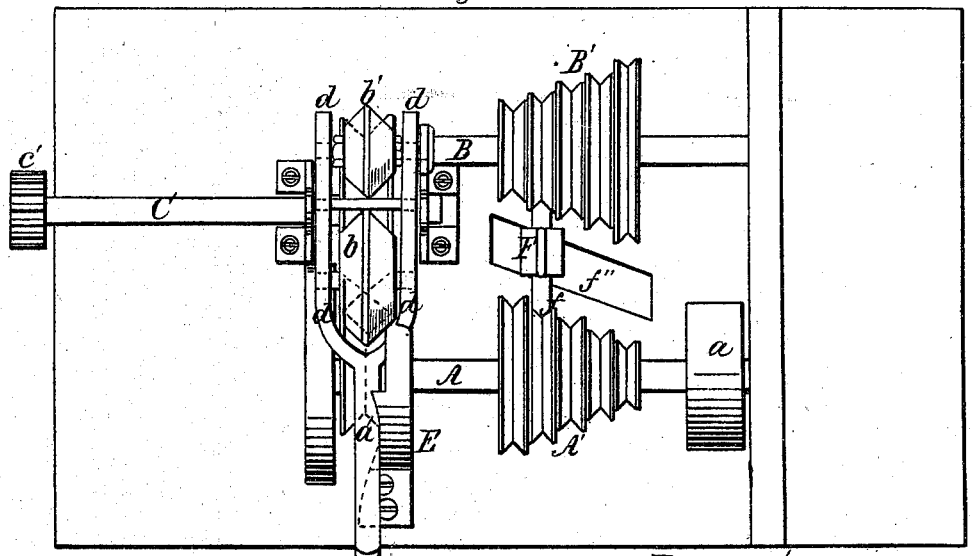
Witnesses  
Jno. F. Fennell  
R. H. Whittlesey
Inventor  
J. R. Hoffman  
By N. Crawford, attorney

United States Patent Office.

JACOB R. HOFFMAN, OF FORT WAYNE, INDIANA.

Letters Patent No. 97,640, dated December 7, 1869.

---

IMPROVEMENT IN SAW-MILLS.

---

The Schedule referred to in these Letters Patent and making part of the same

---

*To whom it may concern:*

Be it known that I, JACOB R. HOFFMAN, of Fort Wayne, in the county of Allen, in the State of Indiana, have invented certain Improvements in Saw-Mills, of which the following is a specification.

My invention relates to the regulation of the speed by which the log-carriage of a saw-mill may be fed toward the saw, at a greater or less speed; and It consists in the improved devices and their arrangements for accomplishing these objects.

In the accompanying drawings—

Figure 1 represents an end view of my improvement;

Figure 2 is a plan view of the same; and

Figure 3 is a detached view of the adjustable removable pulley.

In the drawings—

A represents the driving-shaft, with driving-pulley $a$, V-shaped grooved cone-pulleys A', and V-shaped grooved pulley $a'$, thereon, and all suitably placed in the necessary bearings and in their proper place.

B is a shaft, placed parallel, or nearly so, with shaft A, and has a similar stack of V-shaped grooved pulleys B', and placed so that the grooves in the pulleys will be coincident with the grooves in the pulleys on shaft A.

Near the inner end of the shaft B, and placed between the two legs of a pivoted lever, and fixed firmly thereon, is a small pulley $b'$.

The inner end of shaft B is not journaled into fixed bearings, but into the two legs of the pivoted lever, and has a limited vibratory motion.

C is the driving-shaft for the log-carriage, and has a toothed driving-pinion, $c'$, which gears into the rack on the under side of the log-carriage, upon its inner end, and upon the other end is fixed a grooved pulley, $c$.

D is a pivoted bifurcated lever, and has, below the bifurcation and between its two legs, two angular-faced pulleys $b$ and $b'$, which freely revolve upon axles journaled in the two legs of the lever, and is pivoted at $e$, in such way that when the lever is raised up, pulley, $b'$, will fit into the groove in pulley $c$ on shaft C, and thereby give motion in one direction to shaft C and the log-carriage, but when the end of lever D is depressed, then pulley $b'$ is raised up from contact with pulley $c$, and pulley $b$ is forced into the grooves of pulleys $a'$ and $c$, and becomes the means of reversing the motion of pulley $c$, from that when pulley $b'$ is in contact with pulley $c$. The speed of the revolutions of pulley $c$ is controlled by the relative size or diameter of the pulleys $b$, $b'$, $a'$, and $c$, which can be made of any desired size to suit the kind of work done in the mill. The stacks of grooved cone-pulleys A' and B' on shafts A and B, can also vary in their relative diameters, and thereby produce a different speed upon shaft C.

E is a curved upright spring-support for lever D, and may have notches in its edge, to hold temporarily, the lever D in position.

F is the stock, containing an angular-faced, revolving pulley, $f$, which is hung on an axle in a mortise in stock F, and revolves freely therein.

To the upper end of stock F, is a ring or loop, $f'$, by which the stock and pulley can be adjusted by the operator.

This stock and pulley are placed between the two stacks of grooved cone-pulleys A' and B' on shafts A and B, the angular face of the pulley $f$ will fit into the V-shaped grooves in the pulleys A' and B', and can be placed in any of the grooves on the cone-stacks, at the will of the operator. This intermediate adjustable pulley is the means, when placed to be in contact with the grooves of the stacks of cone-pulleys, of transmitting motion to shaft B and cone-pulleys B', from shaft A, and cone-pulleys A', and the speed of shaft B is graduated and controlled to suit the circumstances, by changing pulley $f$ from one groove to another in the stacks of cone-pulleys, so that the right speed of shaft B is obtained.

Heretofore, when cone-pulleys have been used, they have been in stacks of pulleys of different diameters, or a single cone-pulley, with a plane face, using a belt, so as the belt was shifted to different-sized pulleys or upon the cone where the diameter was different, a change of speed would be the result, but I have never known such stacks of pulleys having different diameters to be grooved in their faces and have a removable intermediate adjustable pulley to communicate motion from one pulley to the other with the greatest ease and despatch, and thereby dispensing with the use of a belt, which is expensive, tedious to manage, liable to break, and soon wears out from the usual pressure on its edge in shifting its location, to change the speed or motion of the machine. Nor have I ever known such arrangement of pulleys as I have shown and described, for the purpose of changing or reversing the movements of the log-carriage, as in my arrangement, by the use of two pulleys in the bifurcated lever, I am enabled to communicate motion from the main driving-shaft to the carriage-shaft by a single pulley, and reverse that motion by shifting the lever to raise that pulley out of contact with the two grooved pulleys, and bring another one in contact with the pulley on the carriage driving-shaft, which will give it a reverse motion from the secondary shaft having the stack of grooved pulleys thereon. My improvement can be applied to turning-lathes, as well as saw-mills, for the purpose of altering the motion.'

I lay no claim to simple cone-pulleys, or to stacks of pulleys having different diameters, knowing such to be old; but having thus fully described my invention,

What I claim as new, and desire to secure by Letters Patent, is—

The stacks of grooved pulleys A' and B' in combination with the intermediate adjustable pulley $f$, when constructed and arranged to operate in the manner and for the purpose substantially as described.

J. R. HOFFMAN.

Witnesses:
J. R. BITTENGER,
JAS. P. FRANCE.